US012424000B2

United States Patent
Yamazaki et al.

(10) Patent No.: US 12,424,000 B2
(45) Date of Patent: Sep. 23, 2025

(54) OBJECT RECOGNITION SYSTEM, OBJECT RECOGNITION METHOD, AND NONTRANSITORY COMPUTER-READABLE STORAGE MEDIUM STORING OBJECT RECOGNITION PROGRAM

(71) Applicant: DENSO CORPORATION, Kariya (JP)

(72) Inventors: Suguru Yamazaki, Kariya (JP); Tomoyuki Oishi, Kariya (JP); Motoki Tanaka, Kariya (JP)

(73) Assignee: DENSO CORPORATION, Kariya (JP)

( * ) Notice: Subject to any disclaimer, the term of this patent is extended or adjusted under 35 U.S.C. 154(b) by 111 days.

(21) Appl. No.: 18/531,515

(22) Filed: Dec. 6, 2023

(65) Prior Publication Data

US 2024/0119745 A1    Apr. 11, 2024

Related U.S. Application Data

(63) Continuation of application No. PCT/JP2022/020385, filed on May 16, 2022.

(30) Foreign Application Priority Data

Jun. 8, 2021    (JP) ................. 2021-096063

(51) Int. Cl.
*G06V 20/64* (2022.01)
*G06T 7/73* (2017.01)
*G06V 20/58* (2022.01)
*G07C 5/00* (2006.01)

(52) U.S. Cl.
CPC ............. *G06V 20/64* (2022.01); *G06T 7/73* (2017.01); *G06V 20/58* (2022.01); *G07C 5/008* (2013.01); *G06T 2207/10028* (2013.01); *G06T 2207/30252* (2013.01)

(58) Field of Classification Search
CPC .......... G06V 20/64; G06V 20/58; G06T 7/73; G06T 2207/10028; G06T 2207/30252; G07C 5/008
See application file for complete search history.

(56) References Cited

U.S. PATENT DOCUMENTS

2009/0167761 A1    7/2009    Hayashi et al.

FOREIGN PATENT DOCUMENTS

| JP | 2014178789 A | * | 9/2014 |
| JP | 2018-173707 A1 | | 11/2018 |
| JP | 2018173707 A | * | 11/2018 |

* cited by examiner

*Primary Examiner* — Girumsew Wendmagegn
(74) *Attorney, Agent, or Firm* — Maschoff Brennan

(57) ABSTRACT

By an object recognition device, an object recognition method, or a non-transitory computer-readable storage medium storing an object recognition program, matching between a three-dimensional dynamic map representing a state of a mapping point group obtained by mapping of a target existing in an observation space and three-dimensional observation data representing a state of an observation point group observed in the observation space is performed, a candidate point of the mobile object is searched, and the mobile object is identified.

9 Claims, 13 Drawing Sheets

OBJECT RECOGNITION SYSTEM, OBJECT RECOGNITION METHOD, AND NONTRANSITORY COMPUTER-READABLE STORAGE MEDIUM STORING OBJECT RECOGNITION PROGRAM

CROSS REFERENCE TO RELATED APPLICATIONS

The present application is a continuation application of International Patent Application No. PCT/JP2022/020385 filed on May 16, 2022, which designated the U.S. and claims the benefit of priority from Japanese Patent Application No. 2021-096063 filed on Jun. 8, 2021. The entire disclosures of all of the above applications are incorporated herein by reference.

TECHNICAL FIELD

The present disclosure relates to an object recognition technology for recognizing a mobile object.

BACKGROUND

An object recognition technology recognizes mobile objects which is movable in an observation space observed by an observation device of a host vehicle, and has become important in recent years. In a comparative example, an object recognition technology extracts point group data regarding a mobile object by comparing three-dimensional distance image data and three-dimensional environmental map data.

SUMMARY

By an object recognition device, an object recognition method, or a non-transitory computer-readable storage medium storing an object recognition program, matching between a three-dimensional dynamic map representing a state of a mapping point group obtained by mapping of a target existing in an observation space and three-dimensional observation data representing a state of an observation point group observed in the observation space is performed, a candidate point of the mobile object is searched, and the mobile object is identified.

DETAILED DESCRIPTION

Figure 1:
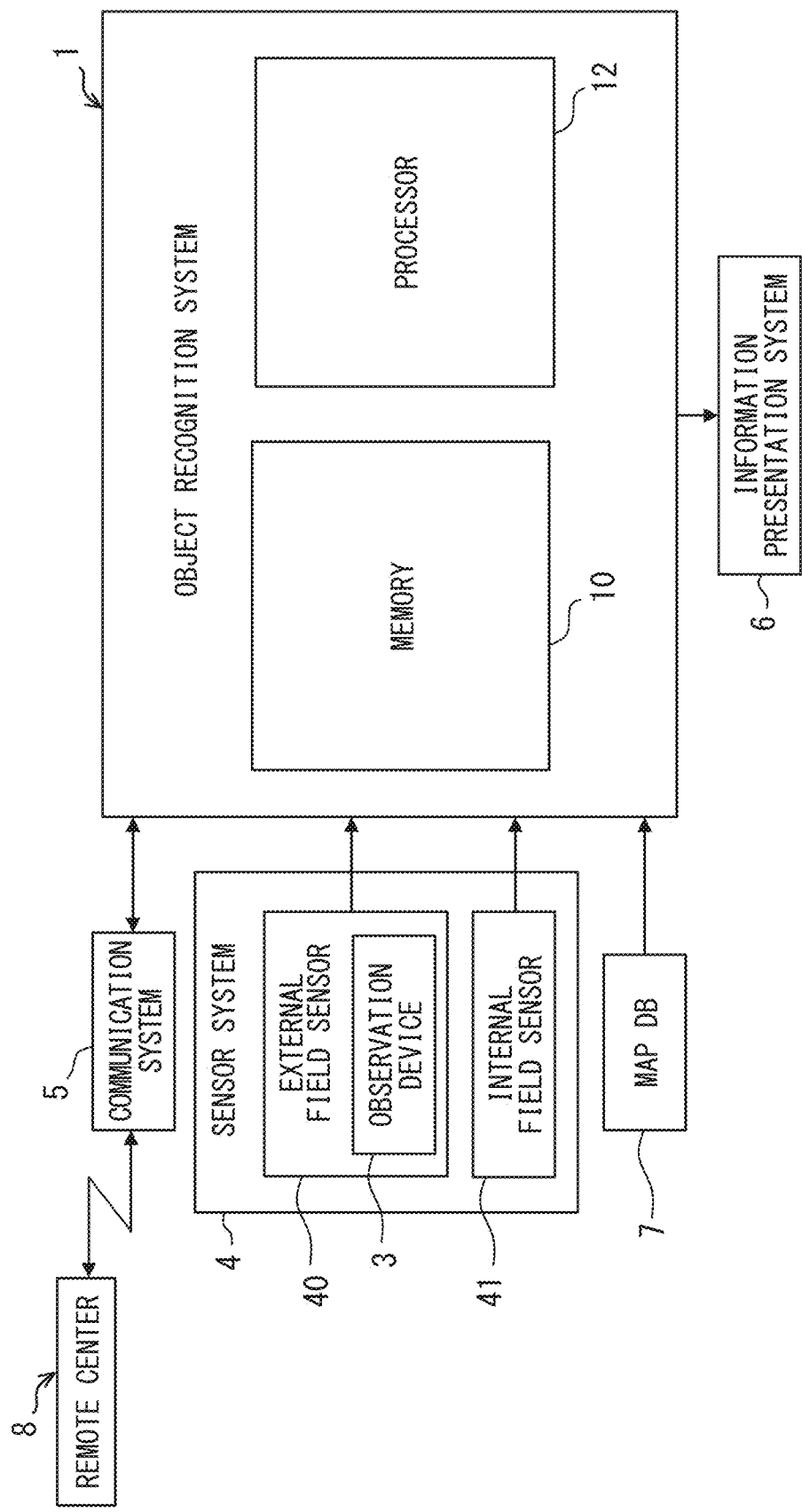
FIG. 1 is a block diagram illustrating an overall configuration of an object recognition system according to an embodiment.

However, in the technology of the comparative example, an observation point group that is not recorded in the three-dimensional environmental map data is extracted as point group data regarding the mobile object. Therefore, when a mobile object is observed close to or superimposed on a target recorded as a point group in the three-dimensional environmental map data, it becomes difficult to accurately recognize the mobile object.

On example of the present disclosure provides an object recognition system that recognizes a mobile object with high accuracy. Another example of the present disclosure provides an object recognition method that recognizes the mobile object with high accuracy. Further, another example of the present disclosure provides a non-transitory computer-readable storage medium storing an object recognition program that recognizes the mobile object with high accuracy.

Hereinafter, a technical solution of the present disclosure for solving the difficulties will be described.

According to one example embodiment, an object recognition system is configured to recognize a mobile object that is movable in an observation space observed by an observation device of a host vehicle, and the system includes a processor configured to perform matching of a three-dimensional dynamic map representing a state of a mapping point group obtained by mapping of a target existing in the observation space and three-dimensional observation data representing a state of an observation point group observed in the observation space; perform search of a candidate point of the mobile object based on the matching from the three-dimensional observation data, the candidate point including a first observation point that does not exist in the three-dimensional dynamic map and a second observation point different from a mapping point of the three-dimensional dynamic map; and perform identification of the mobile object based on the candidate point. The matching of the three-dimensional dynamic map and the three-dimensional observation data includes matching of the three-dimensional dynamic map and the three-dimensional observation data for each three-dimensional voxel obtained by dividing the observation space. The search of the candidate point includes: defining the three-dimensional voxel as a large voxel and setting a plurality of small voxels obtained by dividing the large voxel; searching a candidate voxel in which the candidate point is predicted to be extracted based on a matching result of the three-dimensional dynamic map and the three-dimensional observation data in the large voxel; distinguishing between the first observation point that does not exist in the three-dimensional dynamic map in the plurality of small voxels and the second observation point different from the mapping point of the three-dimensional dynamic map in the plurality of small voxels by performing comparison that: is comparison of a point group distribution of the three-dimensional dynamic map and the three-dimensional observation data for each three-dimensional voxel; and is comparison of the three-dimensional dynamic map and the three-dimensional observation data in the plurality of small voxels set as the candidate voxel; and extracting the candidate point.

According to another example embodiment, an object recognition system is configured to recognize a mobile object that is movable in an observation space observed by an observation device of a host vehicle, and includes a processor configured to: perform matching between a three-dimensional dynamic map representing a state of a mapping point group obtained by mapping of a target existing in the observation space and three-dimensional observation data representing a state of an observation point group observed in the observation space; search a candidate point of the mobile object based on the matching from the three-dimensional observation data, the candidate point including a first observation point that does not exist in the three-dimensional dynamic map and a second observation point different from a mapping point of the three-dimensional dynamic map; monitor a difference between a real number of the candidate point at an extracted specific time and a prediction number of the candidate point at the specific time predicted based on the real number of the candidate point at a past time before the specific time; and perform identification of the mobile object based on the candidate point. The identification of the mobile object includes identifying the mobile object based on the candidate point at the specific time when the difference is within an allowable range.

Further, according to another example embodiment, an object recognition method is executed by a processor for recognizing a mobile object that is movable in an observation space observed by an observation device of a host vehicle, and the method includes: performing matching between a three-dimensional dynamic map representing a state of a mapping point group obtained by mapping of a target existing in the observation space and three-dimensional observation data representing a state of an observation point group observed in the observation space; performing search of a candidate point of the mobile object based on the matching from the three-dimensional observation data, the candidate point including a first observation point that does not exist in the three-dimensional dynamic map and a second observation point different from a mapping point of the three-dimensional dynamic map; and performing identification of the mobile object based on the candidate point. The matching of the three-dimensional dynamic map and the three-dimensional observation data includes matching of the three-dimensional dynamic map and the three-dimensional observation data for each three-dimensional voxel obtained by dividing the observation space. The search of the candidate point includes: defining the three-dimensional voxel as a large voxel and setting a plurality of small voxels obtained by dividing the large voxel; searching a candidate voxel in which the candidate point is predicted to be extracted based on a matching result of the three-dimensional dynamic map and the three-dimensional observation data in the large voxel; distinguishing between the first observation point that does not exist in the three-dimensional dynamic map in the plurality of small voxels and the second observation point different from the mapping point of the three-dimensional dynamic map in the plurality of small voxels by performing comparison that: is comparison of a point group distribution of the three-dimensional dynamic map and the three-dimensional observation data for each three-dimensional voxel; and is comparison of the three-dimensional dynamic map and the three-dimensional observation data in the plurality of small voxels set as the candidate voxel; and extracting the candidate point.

Furthermore, according to another example embodiment, an object recognition method is executed by a processor for recognizing a mobile object that is movable in an observation space observed by an observation device of a host vehicle, and the method includes: performing matching between a three-dimensional dynamic map representing a state of a mapping point group obtained by mapping of a target existing in the observation space and three-dimensional observation data representing a state of an observation point group observed in the observation space; searching a candidate point of the mobile object based on the matching from the three-dimensional observation data, the candidate point including a first observation point that does not exist in the three-dimensional dynamic map and a second observation point different from a mapping point of the three-dimensional dynamic map; monitoring a difference between a real number of the candidate point at an extracted specific time and a prediction number of the candidate point at the specific time predicted based on the real number of the candidate point at a past time before the specific time; and performing identification of the mobile object based on the candidate point. The identification of the mobile object includes identifying the mobile object based on the candidate point at the specific time when the difference is within an allowable range.

Furthermore, according to another example embodiment, a non-transitory computer-readable storage medium stores an object recognition program that is executed by a processor for recognizing a mobile object that is movable in an observation space observed by an observation device of a host vehicle, and the program includes instructions configured to cause the processor to: perform matching between a three-dimensional dynamic map representing a state of a mapping point group obtained by mapping of a target existing in the observation space and three-dimensional observation data representing a state of an observation point group observed in the observation space; perform search of a candidate point of the mobile object based on the matching from the three-dimensional observation data, the candidate point including a first observation point that does not exist in the three-dimensional dynamic map and a second observation point different from a mapping point of the three-dimensional dynamic map; and perform identification of the mobile object based on the candidate point. The matching of the three-dimensional dynamic map and the three-dimensional observation data includes matching of the three-dimensional dynamic map and the three-dimensional observation data for each three-dimensional voxel obtained by dividing the observation space. The search of the candidate point includes: defining the three-dimensional voxel as a large voxel and setting a plurality of small voxels obtained by dividing the large voxel; searching a candidate voxel in which the candidate point is predicted to be extracted based on a matching result of the three-dimensional dynamic map and the three-dimensional observation data in the large voxel; distinguishing between the first observation point that does not exist in the three-dimensional dynamic map in the plurality of small voxels and the second observation point different from the mapping point of the three-dimensional dynamic map in the plurality of small voxels by performing comparison that: is comparison of a point group distribution of the three-dimensional dynamic map and the three-dimensional observation data for each three-dimensional voxel; and is comparison of the three-dimensional dynamic map and the three-dimensional observation data in the plurality of small voxels set as the candidate voxel; and extracting the candidate point.

Furthermore, according to another example embodiment, a non-transitory computer-readable storage medium stores an object recognition program that is executed by a processor for recognizing a mobile object that is movable in an observation space observed by an observation device of a host vehicle, and the program includes instructions configured to cause the processor to: perform matching between a three-dimensional dynamic map representing a state of a mapping point group obtained by mapping of a target existing in the observation space and three-dimensional observation data representing a state of an observation point group observed in the observation space; perform search of a candidate point of the mobile object based on the matching from the three-dimensional observation data, the candidate point including a first observation point that does not exist in the three-dimensional dynamic map and a second observation point different from a mapping point of the three-dimensional dynamic map; and monitor a difference between a real number of the candidate point at an extracted specific time and a prediction number of the candidate point at the specific time predicted based on the real number of the candidate point at a past time before the specific time; and perform identification of the mobile object based on the candidate point. The identification of the mobile object includes identifying the mobile object based on the candidate point at the specific time when the difference is within an allowable range.

According to these example embodiments, the three-dimensional dynamic map representing the state of a mapping point group obtained by mapping of a target existing in the observation space, and the three-dimensional observation data representing the state of the observation point group observed by the observation device of the host vehicle in the observation space are matched. Therefore, from the three-dimensional observation data, not only the observation point that does not exist in the three-dimensional dynamic map, but also the observation point different from the mapping point of the three-dimensional dynamic map are searched as the candidate point for the mobile object based on matching. According to this, even when the mobile object represented by an observation point of the three-dimensional observation data is close to or superimposed on the target represented by the mapping point of the three-dimensional dynamic map, the latter observation point, which deviates from the dynamic map, can be extracted as the candidate point of the mobile object. Therefore, it is possible to recognize the mobile object with high accuracy by identification using such a candidate point.

Hereinafter, an embodiment of the present disclosure will be described with reference to the drawings.

Figure 2:
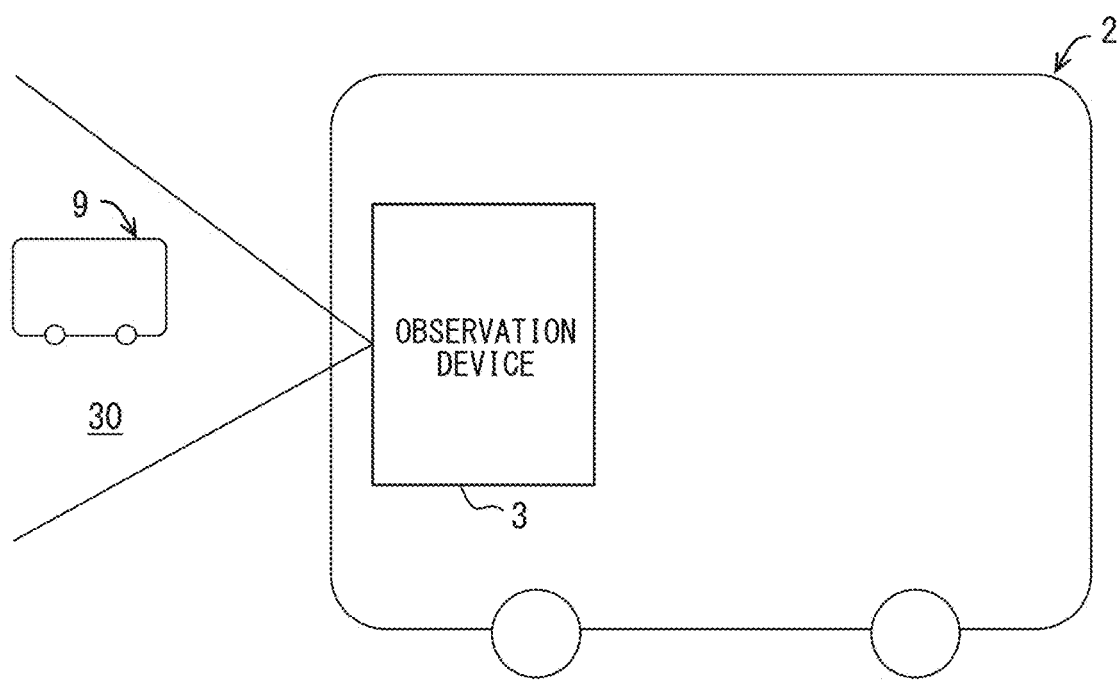
FIG. 2 is a schematic diagram showing a relationship between an observation device of a host vehicle and a mobile object according to the embodiment.

An object recognition system 1 of the embodiment shown in FIG. 1 recognizes a mobile object 9 in an observation space 30 observed by an observation device 3 mounted on a host vehicle 2, as shown in FIG. 2. The mobile objects 9 to be recognized by the object recognition system 1 are multiple types of objects, such as vehicles other than the host vehicle 2. For example, the objects include motorcycles, people, animals, and drones (that are, mobile robots).

The host vehicle 2 of the object recognition system 1 is, for example, a car, and is capable of traveling on a road with an occupant on board. In the host vehicle 2, an automated driving mode is executed such that levels are divided according to the degree of manual intervention by the occupant in a driving task. The automated driving mode may be achieved with an autonomous traveling control, such as conditional driving automation, advanced driving automation, or full driving automation. In the full driving automation, the system in operation state performs all of driving tasks. The automated driving mode may be achieved with an advanced driving assistance control, such as driving assistance or partial driving automation, where an occupant performs partial or all of the driving tasks. The automated driving mode may be achieved with either one or combination of the autonomous traveling control and the advanced driving assistance control. The automated driving mode may also be achieved by switching between the autonomous traveling control and the advanced driving assistance control.

The host vehicle 2 is equipped with a sensor system 4, a communication system 5, an information presentation system 6, and a map database 7 shown in FIG. 1. The sensor system 4 acquires sensor information usable by the object recognition system 1 from the external and internal fields of the host vehicle 2. Therefore, the sensor system 4 includes an external field sensor 40 and an internal field sensor 41.

The external field sensor 40 acquires information about the external field that is a peripheral environment of the host vehicle 2. The external field sensor 40 includes the observation device 3 that acquires external field information by observing the observation space 30 in the external field of the host vehicle 2. The observation device 3 is at least one type that can generate three-dimensional observation data Dt (hereinafter also simply referred to as observation data Dt), which will be described later, among three-dimensional LiDAR (Light Detection and Ranging/Laser Imaging Detection and Ranging), or three-dimensional radar, etc. In addition to the observation device 3, the external field sensor 40 may include at least one type of, for example, a camera, a sonar, or the like, which acquires the external field information by sensing the external field of the host vehicle 2.

The observation device 3 of the external field sensor 40 observes the observation space 30 (see FIG. 2) determined according to a viewing angle set toward the external field of the host vehicle 2 to acquire external field information related to a target in the space 30. In particular, the external field information acquired by the observation device 3 of this embodiment is observation data Dt that three-dimensionally represents the state of the observation point group observed in the observation space 30. The observation data Dt includes a three-dimensional state value regarding at least one type of, for example, position coordinates, distance, azimuth, velocity, or beam reflection intensity.

The internal field sensor 41 acquires information about the internal field, which is the internal environment of the host vehicle 2. The internal field sensor 41 may acquire the internal field information by detecting a specific kinetic physical quantity in the internal environment of the host vehicle 2. The internal field sensor 41 that detects the kinetic physical quantity may be at least one of, for example, a traveling speed sensor, an acceleration sensor, a gyro sensor, or the like. The internal field sensor 41 may acquire the internal environment information by detecting a specific state of an occupant in the internal environment of the host vehicle 2. The internal field sensor 41 that detects an occupant may be at least one of, for example, a driver status monitor (registered trademark), a biosensor, a seating sensor, an actuator sensor, an in-vehicle equipment sensor, or the like.

The communication system 5 acquires communication information usable by the object recognition system 1 through wireless communication. The communication system 5 includes a vehicle to everything (V2X) type that transmits and receives a communication signal to and from a V2X system located outside the host vehicle 2. The communication system 5 of the V2X type may be at least one of, for example, a dedicated short range communications (DSRC) communication device, a cellular V2X (C-V2X) communication device, or the like. The V2X type communication system 5 constructs a communication network capable of communicating with a remote center 8 outside the host vehicle 2.

Here, the remote center 8 mainly includes, for example, at least one type of server unit such as a cloud server or an edge server, and a communication router. For example, the remote center 8 is a management center that manages the driving operation of the host vehicle 2, a service center that provides services related to the host vehicle 2, or the like. For example, in the remote center 8, an output control process such as information display to an operator of the remote center 8 is executed in relation to a road user including the host vehicle 2 that can communicate with the remote center through the communication router. Accordingly, the remote center 8 executes an input control process of receiving information to be fed back to the communicable road user from, for example, an operator of the remote center 8.

The types of the communication system 5 include, in addition to the V2X type that implements communication with the remote center 8, a positioning type that receives positioning signals from a GNSS (Global Navigation Satellite System) satellite existing in the outside field of the host vehicle 2. For example, the communication system 5 having the positioning function may be a GNSS receiver or the like. In addition, the communication system 5 may have a terminal communication function that can transmit and receive a communication signal to and from a terminal located in the internal environment of the host vehicle 2. For example, the communication system 5 having the terminal communication type may be at least one of a Bluetooth (registered trademark) device, a Wi-Fi (registered trademark) device, an infrared communication device, or the like.

The information presentation system 6 presents notification information to the occupants of the host vehicle 2. The information presentation system 6 may present notification information by stimulating the occupant's vision. The visual stimulus type information presentation system 6 is at least one type of, for example, a head-up display (i.e., HUD), a multi function display (i.e., MFD), a combination meter, a navigation unit, a light emitting unit, and the like. The information presentation system 6 may present notification information by stimulating the occupant's auditory. The auditory stimulation type information presentation system 6 is, for example, at least one of a speaker, a buzzer, a vibration unit, and the like.

The map database 7 stores map information usable by the object recognition system 1. The map database 7 includes a non-transitory tangible storage medium, which is at least one type of, for example, a semiconductor memory, a magnetic medium, an optical medium, or the like. The map database 7 may be a database of a locator that estimate a motion state including the position of the host vehicle 2. The map database 7 may be a database of a navigation unit that guides a travel route of the host vehicle 2. The map database 7 may be configured by a combination of multiple different types of databases.

The map database 7 acquires and stores the latest map information by performing communication with the remote center 8 through the communication system 5 of V2X type. In particular, the map information of the present embodiment is a three-dimensional dynamic map Mt (hereinafter also simply referred to as dynamic map Mt) as digital data of a high accurate map that is converted into three-dimensional data to represent the traveling environment of the host vehicle 2. The dynamic map Mt represents the state of a mapping point group in which a target existing in the observation space 30 of the observation device 3 is mapped. The dynamic map Mt includes, for example, three-dimensional state values regarding at least one type of the target object's position coordinates, distance, azimuth, shape, and the like. The target object to be mapped in the dynamic map Mt is at least one type of, for example, stationary object including a road, such as a road, a sign, a traffic light, a building, a tree, or the like.

The object recognition system 1 is connected to the sensor system 4, the communication system 5, the information presentation system 6, and the map database 7 via at least one of, for example, a local area network (LAN) line, a wire harness, an internal bus, or a wireless communication line. The object recognition system 1 includes at least one dedicated computer.

The dedicated computer constituting the object recognition system 1 may be a drive control ECU (i.e., Electronic Control Unit) that controls the driving operation of the host vehicle 2. The dedicated computer constituting the object recognition system 1 may be a navigation ECU that navigates the travel path of the host vehicle 2. The dedicated computer constituting the object recognition system 1 may be a locator ECU that estimates a motion state including a position of the host vehicle 2. The dedicated computer constituting the object recognition system 1 may be an HCU (i.e, Human Machine Interface Control Unit or HMI Control Unit) that controls information presentation by the information presentation system 6 in the host vehicle 2. The dedicated computer constituting the object recognition system 1 may be a computer other than the host vehicle 2, which constitutes an external server or a mobile terminal capable of communicating with the communication system 5, for example.

The dedicated computer constituting the object recognition system 1 includes at least one memory 10 and at least one processor 12. The memory 10 is a non-transitory tangible storage medium, which is at least one type of, for example, a semiconductor memory, a magnetic medium, and an optical medium, for storing, in non-transitory manner, computer readable programs and data. For example, the processor 12 may include, as a core, at least one of a central processing unit (CPU), a graphics processing unit (GPU), a reduced instruction set computer (RISC) CPU, a data flow processor (DFP), a graph streaming processor (GSP), or the like.

Figure 3:
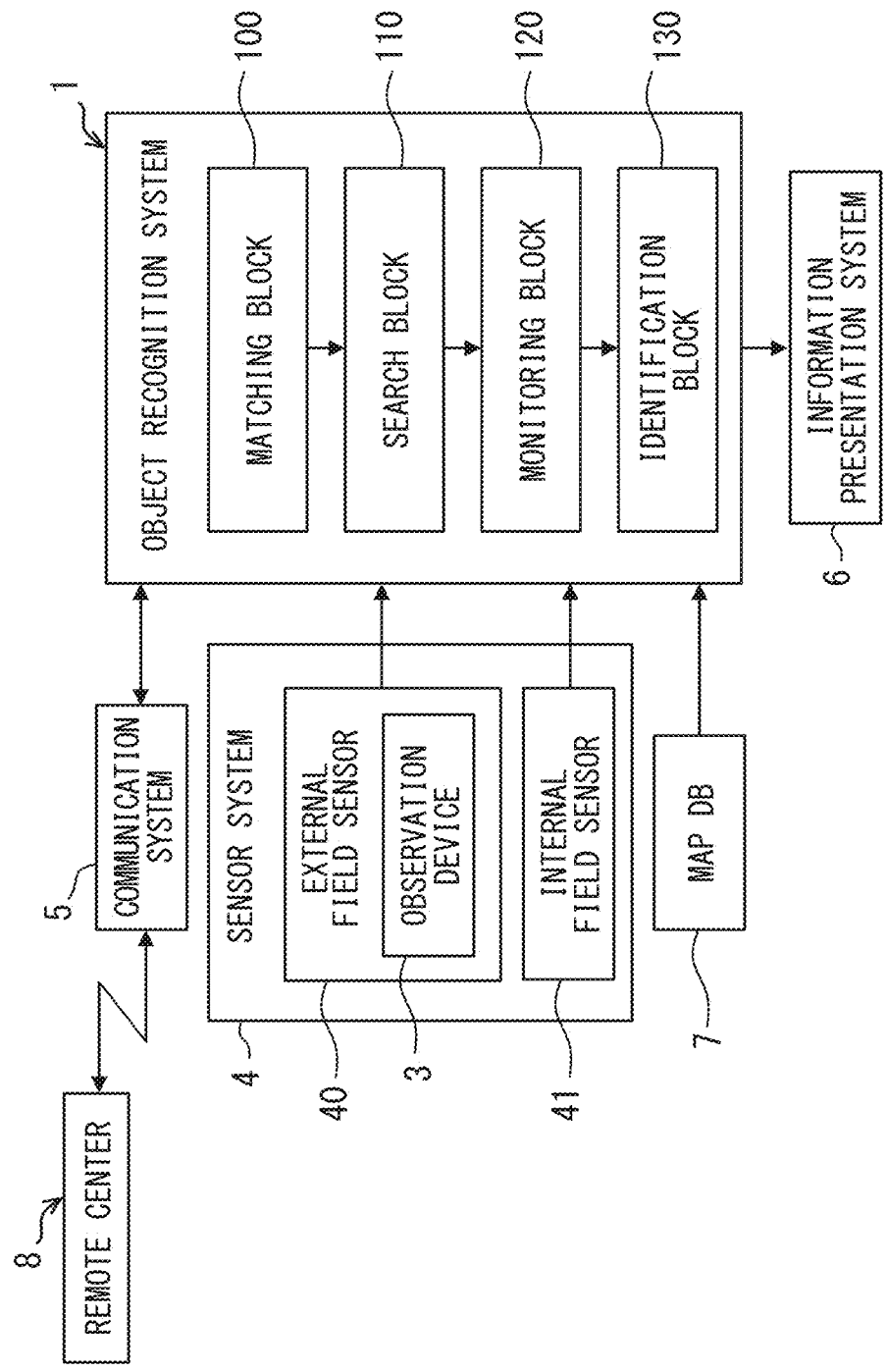
FIG. 3 is a block diagram showing a functional configuration of the object recognition system according to the embodiment.

The processor 12 executes a plurality of instructions included in an object recognition program stored in the memory 10 in order to recognize the mobile object 9 that is movable in the observation space 30 and observed by the observation device 3. Thereby, the object recognition system 1 constructs a plurality of functional blocks for recognizing the mobile object 9 in the observation space 30. The plurality of functional blocks constructed in the object recognition system 1 include a matching block 100, a search block 110, a monitoring block 120, and an identification block 130, as shown in FIG. 3.

The flow of an object recognition method (hereinafter referred to as recognition flow) in which the object recognition system 1 recognizes the mobile object 9 in the observation space 30 through the cooperation of these blocks 100, 110, 120, and 130 will be described below with reference to FIG. 4. The algorithm cycle of the recognition flow is repeatedly executed during startup of the host vehicle 2. Further, in this recognition flow, "S" means steps of the process executed by instructions included in the object recognition program.

In S101 of the recognition flow, the matching block 100 acquires the latest dynamic map Mt from the remote center 8 via the communication system 5. The matching block 100 in S101 updates the map database 7 with the acquired dynamic map Mt. The acquisition of the dynamic map Mt in S101 may be skipped when the dynamic map Mt has not been updated at the remote center 8 since the previous acquisition. The acquisition of the dynamic map Mt in S101 is executed every predetermined period, and may be skipped at times other than the execution timing. The acquisition of the dynamic map Mt in S101 may be performed according to a control flow different from the recognition flow in the host vehicle 2, for example, at an update necessary timing or at regular intervals, and then may be omitted from the recognition flow.

In S102 of the recognition flow, the matching block 100 acquires the latest observation data Dt acquired by the observation device 3. In S103 of the recognition flow, the matching block 100 matches the dynamic map Mt and the observation data Dt.

Figure 5:
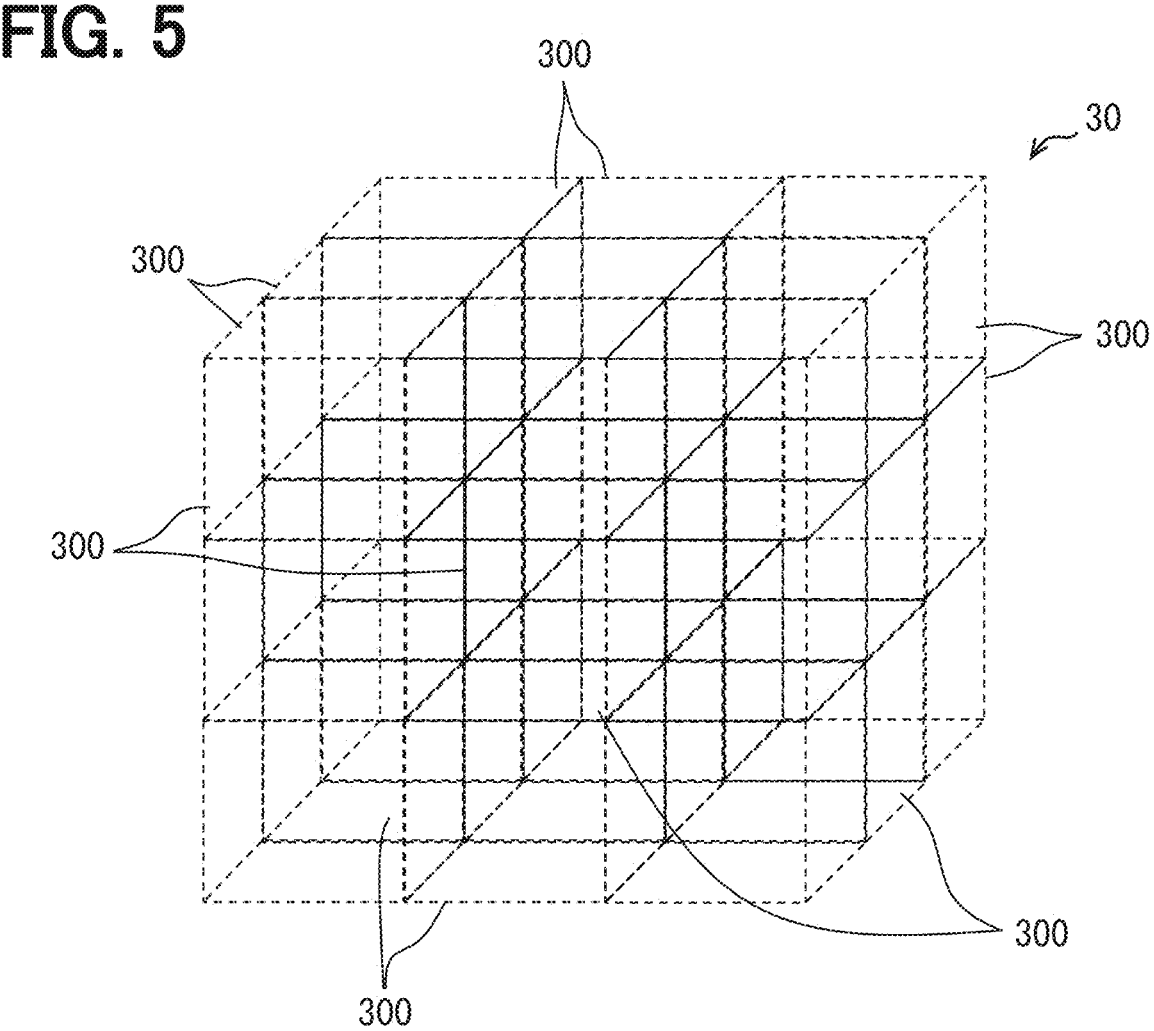
FIG. 5 is a schematic diagram for illustrating voxel setting according to the embodiment.
Figure 6:
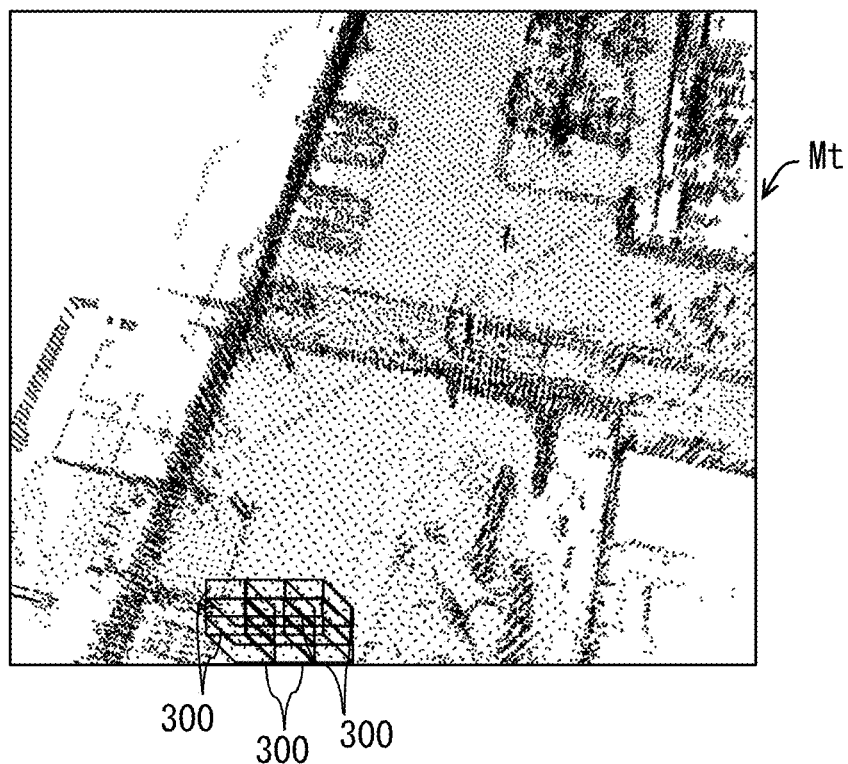
FIG. 6 is a schematic diagram showing a relationship between a three-dimensional dynamic map and voxels according to the embodiment.

Specifically, the matching block 100 in S103 sets a plurality of three-dimensional voxels 300 (hereinafter also referred to as division voxels) 300 obtained by dividing the observation space 30 as shown in FIG. 5 to the dynamic map Mt as shown in FIG. 6. Each division voxel 300 is defined as a three-dimensional grid of a cube or a rectangular parallelepiped having six sides along the three-dimensional absolute coordinate axis assigned to the observation space 30. However, near the outermost edge of the observation space 30 determined according to the viewing angle of the observation device 3, the division voxels 300 are defined in a partial shape of a three-dimensional lattice, which is part of the cube or the rectangular parallelepiped. The grid size of each divided voxel 300 is set to either the same size or a plurality of different sizes, as long as no gap space occurs between the division voxels 300 in the observation space 30. For example, the length of six sides of each division voxel 300 having the same cubic lattice shape is set to 1.5 meters or the like.

The matching block 100 in S103 extracts matching data necessary for matching from the dynamic map Mt for each division voxel 300. In particular, in this embodiment, the matching data extracted from the dynamic map Mt includes, for example, at least one of the size of the divided voxel 300, the vertex coordinates of the division voxel 300, the identification information of the division voxel 300, the presence or absence of a mapping point group, the average coordinates of the mapping point group, the variance value of the mapping point group, or the like. Therefore, the shape definition and matching data for each division voxel 300 may be given from the remote center 8 as map information included in the dynamic map Mt, may be generated in S103 based on the map information included in the dynamic map Mt, or may be provided by the combination.

The matching block 100 in S103 executes NDT scan matching for each division voxel 300 between the dynamic map Mt and the observation data Dt, particularly in this embodiment, based on a NDT (Normal Distribution Transform) algorithm. The NDT scan matching, first, sets translational rotation parameters for converting the point group coordinate system of the observation data Dt to the point group coordinate system of the dynamic map Mt. The setting of the translational rotation parameters starts from initial parameters based on at least one of, for example, acquisition information from a positioning type communication system 5, past estimation results of the driving state of the host vehicle 2, or the like.

The NDT scan matching calculates the degree of matching of observation data Dt to dynamic map Mt for each observation point according to a first equation based on the set translational rotation parameters. Here, the k in the first equation is an index that identifies the division voxel 300 in the dynamic map Mt. The i in the first equation is an index that identifies an observation point in the observation data Dt. The $p_i$ in first equation is the position coordinate after conversion by the translational rotation parameter regarding the observation point with index i in the observation data Dt. The $q_k$ in the first equation is the average coordinate of the mapping point group included in the division voxel 300 of index k to which the converted position coordinate $p_i$ belongs in the dynamic map Mt. The $\Sigma_k$ in the first equation is the covariance value of the mapping point group included in the division voxel 300 of index k to which the converted position coordinate pi belongs in the dynamic map Mt. The $s_i$ in the first equation is the degree of matching with respect to the observation point of the converted position coordinate $p_i$, that is, with respect to the observation point of the index i at the set translational rotation parameter.

$$s_i = \exp\left(\frac{-(p_i - q_k)^T \sum_k^{-1} (p_i - q_k)}{2}\right) \quad \text{(First Equation)}$$

The NDT scan matching calculates the summation value of matching degrees $s_i$ for all observation points of index i according to a second equation as a score SC for the set translational rotation parameter. Therefore, by a Newton method that repeatedly executes an optimization process of the score SC while changing the translational rotation parameter, the NDT scan matching determines the converted position coordinate $p_i$ using the translational rotation parameter that results in optimal matching, with respect to the observation point of each index i. Thereby, the observation points of each index i constitute the observation data Dt, and are respectively associated with the division voxels 300 to which the converted position coordinates $p_i$ belong.

Second Equation $$SC = \Sigma s_i$$

The matching block 100 in S103 calculates the average matching degree of observation points in the observation data Dt as a matching result for each division voxel 300. The calculation of the average matching degree follows a third equation based on the matching degree $s_i$ for the observation point of each index i whose converted position coordinate pi is determined by the NDT scan matching. At this time, the average matching degree is preferably normalized between all division voxels 300 from a value according to the third equation so that the maximum value is 1 and the minimum value is 0. Here, the $I_k$ in the third equation is an index of the observation point associated with the division voxel 300 with index k in the observation data Dt, and the determined converted transformation position coordinate $p_i$ belongs to the division voxel 300. The $n_k$ in the third equation is the number of existing observation points whose determined converted position coordinates pi belong to the division voxel 300 with index k. The $\mu_k$ in the third equation is the average degree of matching between the observation points whose determined converted position coordinates $p_i$ belong to the division voxel 300 with index k.

$$\mu_k = \sum_{i \in I_k} s_i / n_k \quad \text{(Third Equation)}$$

Figure 7:
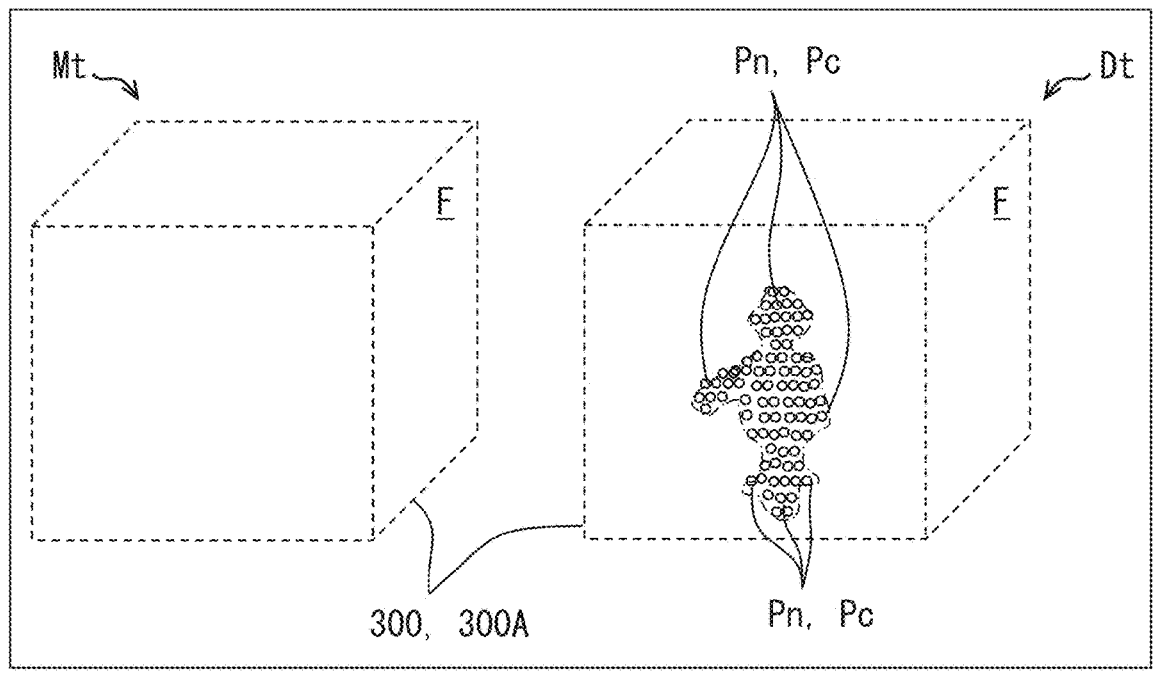
FIG. 7 is a schematic diagram for illustrating candidate point search according to the embodiment.

As shown in FIG. 7, the matching block 100 in S103 extracts an interest voxel 300A in which at least one observation point of the observation data Dt exists among division voxels 300 in which no mapping point exists in the division voxel 300, as shown in FIG. 7. The extracted interest voxel 300A is given an attention flag F as the matching result for each division voxel 300. Note that by executing the extraction of the interest voxel 300A before the calculation of the average matching degree $\mu_k$ described above, the calculation for the interest voxel 300A may be omitted.

The matching block 100 in S103 further estimates the motion state including the position and orientation of the host vehicle 2 based on the converted position coordinates $p_i$ at the observation point of each index i determined as the matching result by the NDT scan matching. At this time, the driving state estimation process is executed using, for example, an extended Kalman filter or the like.

Figure 4:
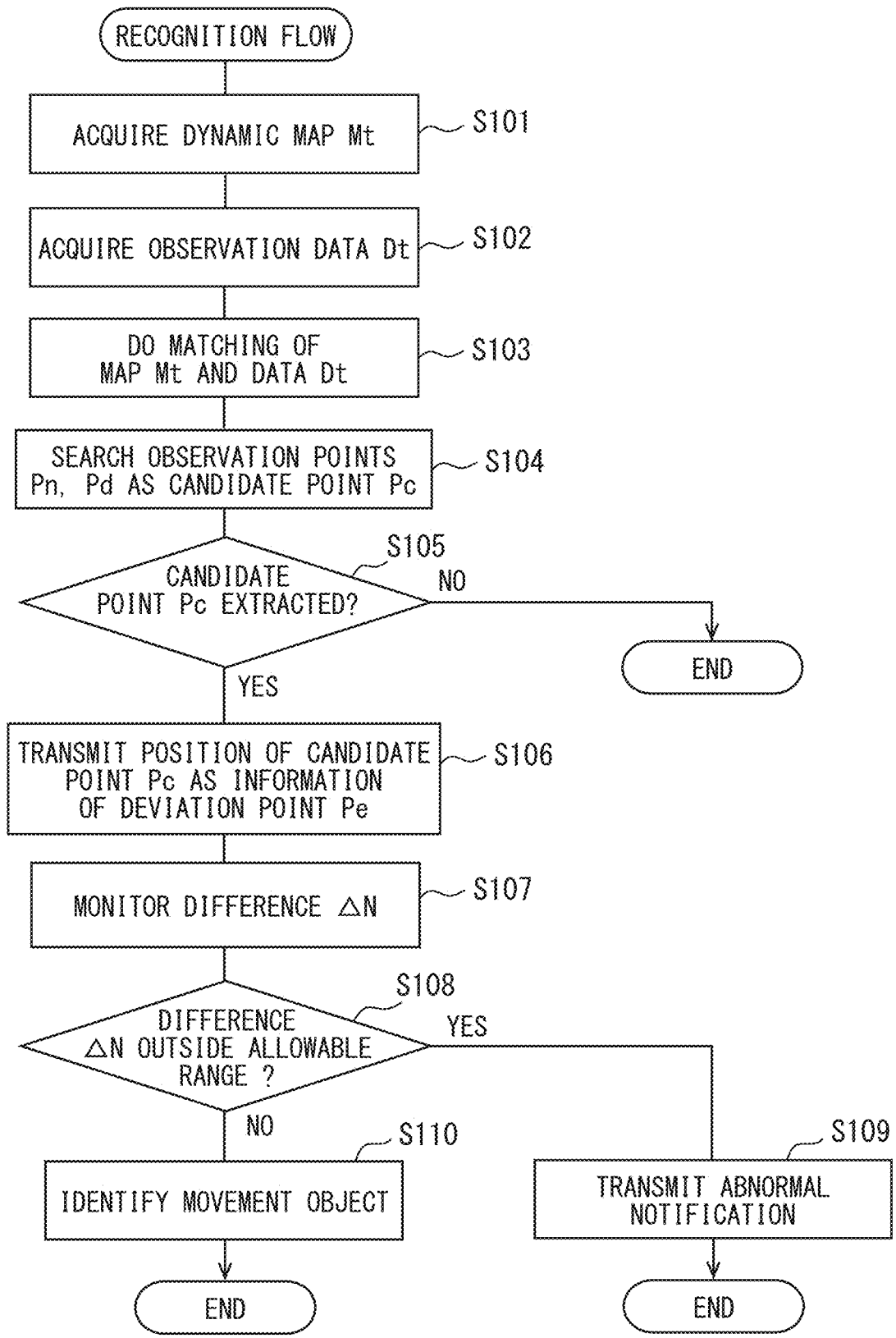
FIG. 4 is a flowchart showing an object recognition method according to the embodiment.
Figure 8:
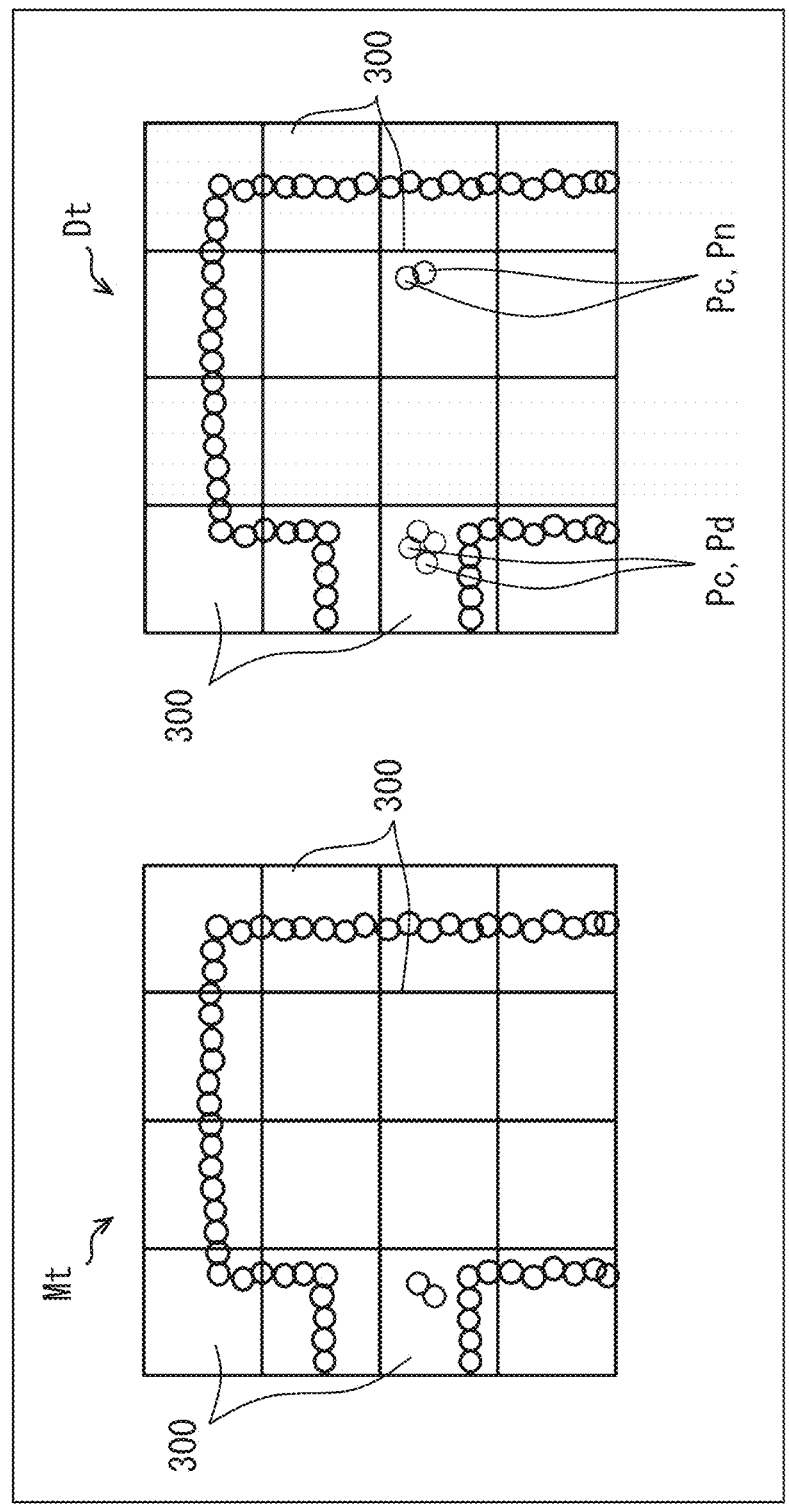
FIG. 8 is a schematic diagram for illustrating the candidate point search according to the embodiment.

In S104 of the recognition flow shown in FIG. 4, the search block 110 searches for a candidate point Pc of the mobile object 9 from the observation data Dt based on the matching result by the matching block 100 in S103. The searched candidate points Pc include an observation point Pn that does not exist in the dynamic map Mt in the observation data Dt, and an observation point Pd that is different from the mapping point of the dynamic map Mt in the data Dt as shown in FIG. 8, which schematically shows the division voxel 300 in two dimensions.

Specifically, the search block 110 in S104 sets, to the candidate points Pc, the observation points belonging to the interest voxel 300A to which the attention flag F has been assigned as shown in FIG. 7 by the matching block 100 in S103, that is, the observation points Pn for which there is no corresponding mapping point in the dynamic map Mt. By using the attention flag F as a matching result in this way, it is possible to improve the efficiency of the search process.

Figure 9:
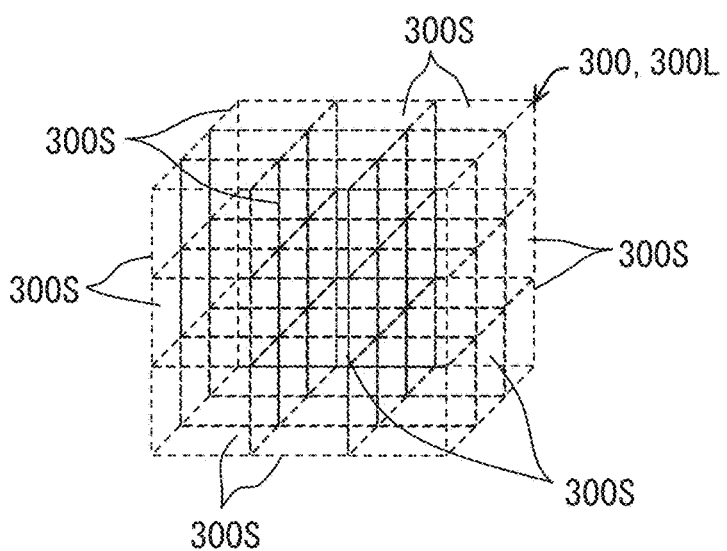
FIG. 9 is a schematic diagram for illustrating the candidate point search according to the embodiment.

As shown in FIG. 9, the search block 110 in S104 defines the division voxel 300 other than the interest voxel 300A as a large voxel 300L, and sets a plurality of small voxels 300S obtained by further dividing the large voxel 300L. The shape and size of each small voxel 300S are set according to the case of the division voxel 300 as the large voxel 300L. For example, the length of six sides of each small voxel 300S in the same cubic lattice shape is set to a length such as 0.5 meters.

Figure 10:
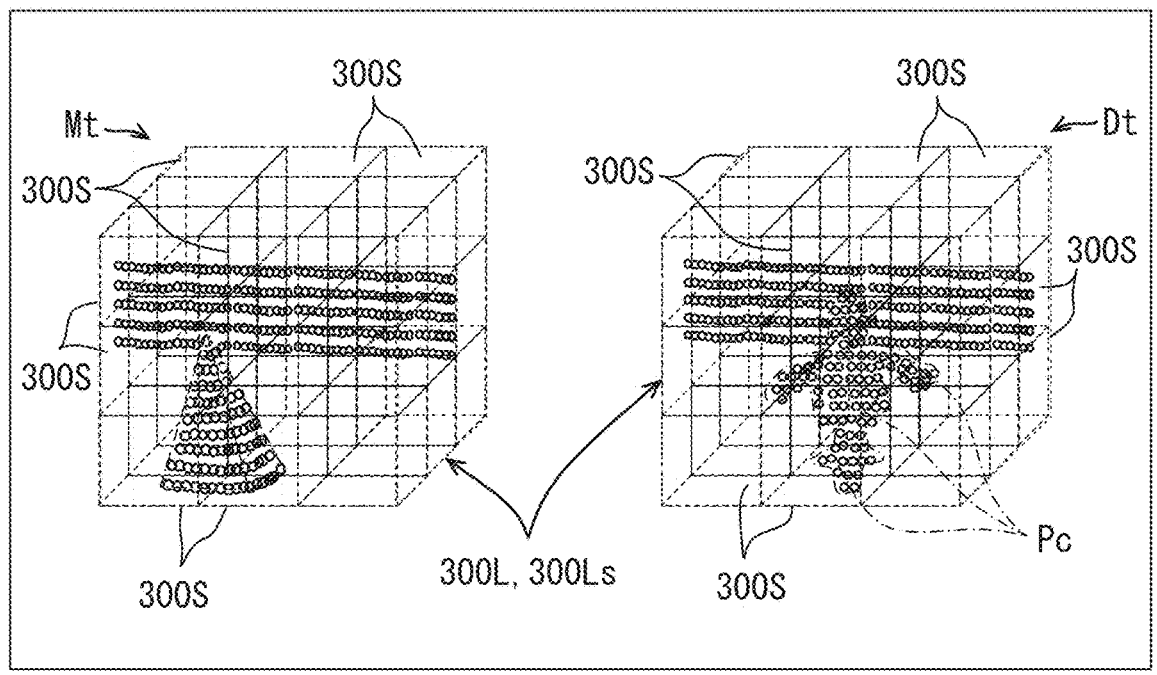
FIG. 10 is a schematic diagram for illustrating the candidate point search according to the embodiment.

As shown in FIG. 10, the search block 110 in S104 searches for a main candidate voxel 300Lc from which extraction of the candidate point Pc is predicted, among the large voxels 300L from which the interest voxel 300A has been removed. The main candidate voxel 300Lc is searched based on the average matching degree $\mu_k$ as the matching result obtained for the division voxel 300 defined as the large voxel 300L by the matching block 100 in S103. The main candidate voxel 300Lc selected by the search is defined by, particularly in the present embodiment, the large voxel 300L whose average matching degree $\mu_k$ is equal to or less than a selection threshold. Here, the selection threshold is defined so as to ensure extraction reliability of the candidate point Pc. Note that by performing the search and selection of the main candidate voxel 300Lc before the setting of the small voxel 300S described above, the setting for the large voxel 300L that is removed from the main candidate voxel 300Lc may be omitted.

Figure 11:
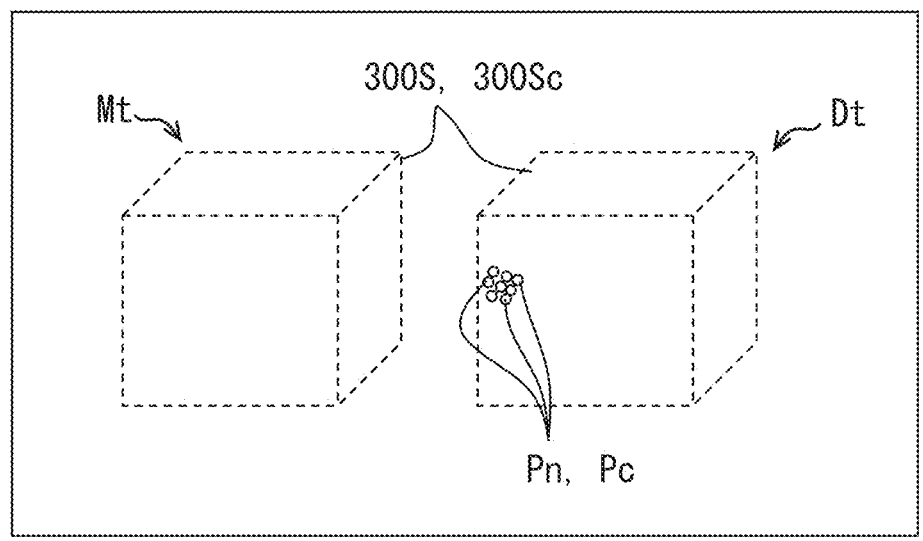
FIG. 11 is a schematic diagram for illustrating the candidate point search according to the embodiment.

The search block 110 in S104 compares the point group distribution of the dynamic map Mt and the observation data Dt for each small voxel 300S set to the large voxel 300L as the main candidate voxel 300Lc. By comparing the point group distribution, as shown in FIG. 11, the search block 110 sets, to the candidate point Pc, the observation point from a sub-candidate voxels 300Sc in which at least one observation point of the observation data Dt exists among the small voxels 300S in which no mapping points exist in the dynamic map Mt. That is, in the sub-candidate voxel 300Sc, all observation points Pn for which no corresponding mapping point exists in the dynamic map Mt are extracted as the candidate points Pc.

Figure 12:
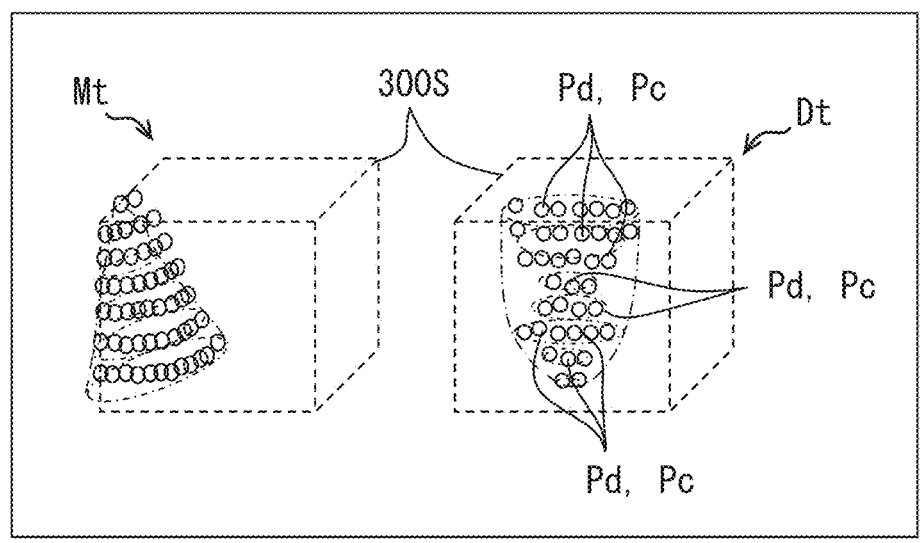
FIG. 12 is a schematic diagram for illustrating the candidate point search according to the embodiment.

As shown in FIG. 12, the search block 110 in S104 further proceed comparison that quantifies the difference in the point group distribution on the small voxel 300S excluding the sub-candidate voxel 300Sc in the large voxel 300L as the main candidate voxel 300Lc. In particular, in the present embodiment, the comparison of the point group distribution sets, to the candidate point Pc, the observation point existing in the small voxel 300S of which, for example, an estimation value by MMD (Maximum Mean Discrepancy) or inter distribution distance such as a Mahalanobis' distance is equal to or higher than a comparison threshold. Here, the comparison threshold is defined so as to ensure extraction reliability of the candidate point Pc. As described above, in the small voxel 300S where both mapping point and observation point exist, the observation point Pd, which is different from the mapping point of the dynamic map Mt, is extracted as the candidate point Pc that is distinguished from the observation point Pn, which does not exist in the dynamic map Mt.

In S105 of the recognition flow shown in FIG. 4, the search block 110 determines whether the candidate point Pc was extracted in S104. As a result, when a negative determination is made, the current cycle of the recognition flow ends. On the other hand, when a positive determination is made, the recognition flow proceeds to processes after S106. In S106, the search block 110 transmits the position information of the candidate point Pc extracted by the search block 110 in S104 to the remote center 8 as information on a deviation point Pe that deviates from the dynamic map Mt in the observation data Dt. The transmitted position information includes at least one type of, for example, the converted position coordinate $p_i$ of the extraction candidate point Pc, the vertex coordinate of the small voxel 300S or the division voxel 300 including the extraction candidate point Pc, or the like.

Figure 13:
FIG. 13 is a schematic diagram for illustrating visualization of position information regarding the candidate point search according to the embodiment.

At the remote center 8 to which the position information is transmitted by the search block 110 in S106, the dynamic map Mt that will be acquired by the matching block 100 in S101 from the next cycle after the transmission is rewritten by updating based on the location information. At this time, in the remote center 8, as shown in FIG. 13, the position information of the extraction candidate point Pc may be visually displayed in the superimposed manner on the dynamic map Mt, and may be presented to the operator involved in the update process. Note that FIG. 13 shows an example in which the vertex coordinates of the division voxel 300 including the extraction candidate point Pc are visually displayed.

Figure 14:
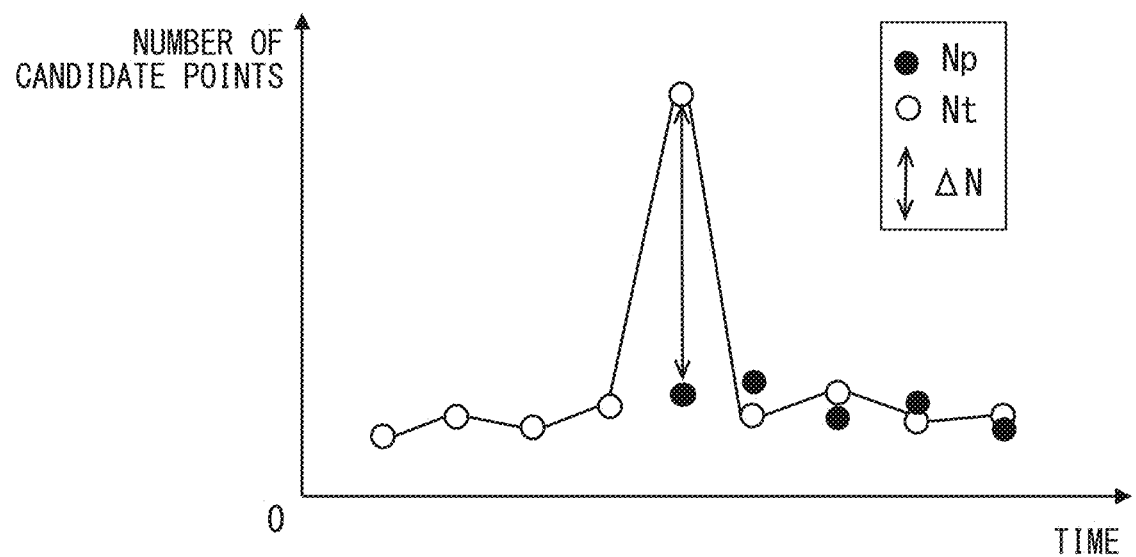
FIG. 14 is a schematic diagram for illustrating difference monitoring according to the embodiment.
Figure 15:
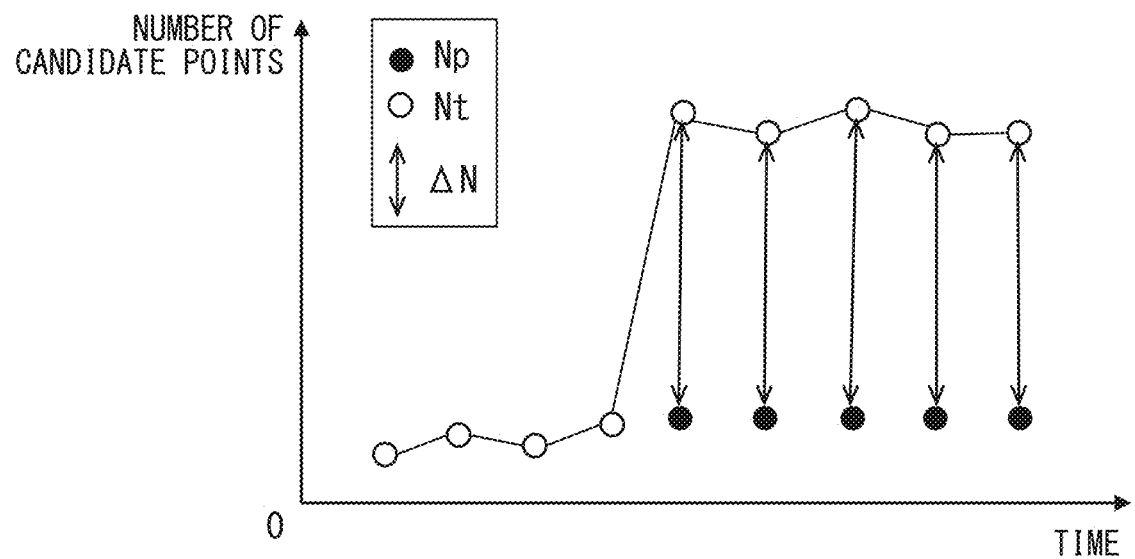
FIG. 15 is a schematic diagram for illustrating the difference monitoring according to the embodiment.

In S107 of the recognition flow shown in FIG. 4, the monitoring block 120 monitors a difference ΔN between a prediction number Np and a real number Nr that appears, at a specific time where the candidate point Pc is extracted by the search block 110 in S104, as shown in FIGS. 14 and 15. In monitoring the difference ΔN, the prediction number Np that is compared with the real number Nr of candidate points Pc is predicted based on the real number Nr of candidate points Pc extracted in each of a plurality of past cycles, which are past times before a specific time. For example, a linear regression model is used for the prediction.

In S108 of the recognition flow shown in FIG. 4, the monitoring block 120 determines whether the difference ΔN recognized at the specific time in S107 is equal to or higher than an abnormality threshold that is outside the allowable range. Here, the abnormality threshold that defines the allowable range is set to distinguish between an abnormality in the dynamic map Mt itself and an abnormality in the matching between the dynamic map Mt and observation data Dt by the matching block 100 in S104. The determination that the difference ΔN is outside the allowable range may be made at only one point at a specific time as shown in FIG. 14, or may be made when the difference ΔN outside the allowable range is continuous at multiple points at past times, as shown in FIG. 15.

When the difference ΔN is outside the allowable range and the monitoring block 120 makes a positive determination in S108, the recognition flow shifts to S109 as shown in FIG. 4. In S109, the monitoring block 120 transmits, to the remote center 8, an abnormality notification associated with the dynamic map Mt so as to include travel information of the host vehicle 2 at the specific time when the candidate point Pc was extracted. Upon completion of transmission of this abnormality notification, the current cycle of the recognition flow ends. Note that the monitoring block 120 in S108 may present the abnormality notification to the occupant of the host vehicle 2 through the information presentation system 6, or may accumulate a record of the abnormality notification in the memory 10 together with a time stamp.

Figure 16:
FIG. 16 is a schematic diagram for illustrating visualization of the point information regarding abnormality notification according to the embodiment.

In the remote center 8 to which the abnormality notification was transmitted by the monitoring block 120 in S109, the dynamic map Mt that will be acquired by the matching block 100 in S101 of the next cycle after the transmission is rewritten by updating based on the abnormality notification. At this time, in the remote center 8, as shown in FIG. 16, point information I representing the traveling point as the traveling information of the vehicle 2 at the specific occurrence time of the abnormality notification may be visually displayed and superimposed on the dynamic map Mt, and presented to the operator involved in the update process. Note that FIG. 16 shows an example in which the point information I is visually displayed when the difference ΔN outside the allowable range continues at a plurality of points.

When the difference ΔN is inside the allowable range and the monitoring block 120 makes a negative determination in S108, the recognition flow shifts to S110 as shown in FIG. 4. In S110, the identification block 130 identifies the mobile object 9 based on the candidate point Pc, at the specific time, extracted by the search block 110 in S104. The identification of the mobile object 9 based on the candidate point Pc may be performed using, for example, a learning model based on a neural network such as deep learning. The identification of the mobile object 9 based on the candidate point Pc may be performed using a rule-based determination algorithm such as machine vision, for example. Upon completion of the identification of the mobile object 9, the current cycle of the recognition flow ends. The identification block 130 in S110 may present the recognition result of the identification of the mobile object 9 to the occupant of the host vehicle 2, or may store the record of the recognition result in the memory 10 together with a time stamp.

Operation and Effects

The operation and effects in the present embodiment described above will be explained below.

According to the present embodiment, the three-dimensional dynamic map Mt representing the state of a mapping point group obtained by mapping of a target existing in the observation space 30, and the three-dimensional observation data Dt representing the state of the observation point group observed by the observation device 3 of the host vehicle 2 in the observation space 30 are matched. Therefore, from the observation data Dt, not only the observation point Pn that does not exist in the dynamic map Mt, but also the observation point Pd different from the mapping point of the dynamic map Mt are searched as the candidate point Pc for the mobile object 9 based on matching. According to this, even when the mobile object 9 represented by the observation point of the observation data Dt is close to or superimposed on the target represented by the mapping point of the dynamic map Mt, an observation point Pd that deviates from the dynamic map Mt is extracted as the candidate point Pc of the mobile object 9. Therefore, it is possible to recognize the mobile object 9 with high accuracy by identification using such a candidate point Pc.

According to this embodiment, the dynamic map Mt and the observation data Dt are matched for each three-dimensional voxel 300 obtained by dividing the observation space 30 into a plurality of parts. Therefore, by comparing the point group distributions of the dynamic map Mt and the observation data Dt for each matched three-dimensional voxel 300, it is possible to accurately extract the candidate points Pc. Therefore, it is possible to contribute to the highly accurate recognition of the mobile object 9.

According to the present embodiment, the plurality of small voxels 300S are set by further dividing the three-dimensional voxel 300 defined as the large voxel 300L. Therefore, based on the matching result between the dynamic map Mt and the observation data Dt in the large voxel 300L, the candidate voxel 300Lc from which extraction of the candidate point Pc is predicted among the large voxels 300L can be globally searched. According to this, the extraction of candidate points Pc by comparing the point group distribution between the dynamic map Mt and observation data Dt in the small voxel 300S can be locally concentrated in the small voxel 300S set in the candidate voxel 300Lc. Therefore, it is possible to implement the recognition of the mobile object 9 with high accuracy and high efficiency.

According to the present embodiment, the observation point Pn that does not exist in the dynamic map Mt in the small voxel 300S and the observation point Pd that is different from the mapping point in the dynamic map Mt in the small voxel 300S are extracted separately. According to the locally concentrated search at the small voxel 300S in such a manner, it is possible to accurately extract the observation point Pd as the candidate point Pc even when the mobile object 9 represented by the observation point of the observation data Dt is close to or superimposed on the target represented by the mapping point of the dynamic map Mt. Therefore, it is possible to contribute to highly accurate and highly efficient recognition of the mobile object 9.

According to the present embodiment, the position information of the extracted candidate point Pc is transmitted to the remote center 8 that can communicate with the host vehicle 2 as information on the deviation point Pe that diverges from the dynamic map Mt in the observation data Dt. Therefore, by acquiring the updated dynamic map Mt from the remote center 8 after transmitting the position information, the existence of observation points Pn and Pd that are deviated from the dynamic map Mt is reflected as mapping points to be matched. Therefore, it is possible to contribute to the highly accurate recognition of the mobile object 9.

According to the present embodiment, the difference ΔN is monitored, the difference being between the real number Nr of the candidate point Pc at a specific time and the prediction number Np of the candidate point Pc at a specific time predicted based on the real number Nr of the candidate point Pc at the past time before the specific time. Here, when the difference ΔN between the real number Nr of the candidate point Pc at a specific time and the prediction number Np is outside the allowable range, an abnormality in the dynamic map Mt itself and a matching abnormality between the dynamic map Mt and the observation data Dt can be assumed. Conversely, when the difference ΔN at the specific time is within the allowable range, it is possible to improve the recognition accuracy and reliability of the mobile object 9 by identifying the mobile object 9 based on the candidate point Pc at the same time.

According to the present embodiment, when the difference ΔN between the real number Nr of the candidate point Pc at a specific time and the predicted number Np is outside the allowable range, the abnormality notification associated with the dynamic map Mt is transmitted to the remote center 8 that can communicate with the host vehicle 2. Therefore, by acquiring the updated dynamic map Mt from the remote center 8 after transmitting the abnormality notification, the target state of the abnormality notification can be reflected in the mapping point to be matched. Therefore, it is possible to contribute to the highly accurate recognition of the mobile object 9.

Other Embodiments

Although one embodiment has been described, the present disclosure should not be limited to the above embodiment and may be applied to various other embodiments within the scope of the present disclosure.

The dedicated computer of the object recognition system 1 of the modification example may include at least one of a digital circuit and an analog circuit as a processor. In particular, the digital circuit is at least one type of, for example, an ASIC (Application Specific Integrated Circuit), a FPGA (Field Programmable Gate Array), an SOC (System on a Chip), a PGA (Programmable Gate Array), a CPLD (Complex Programmable Logic Device), and the like. Further, such a digital circuit may include a memory storing a program.

The division voxels 300 in the modification may be defined in a three-dimensional shape other than the three-dimensional grid shape, as long as a gap space between the division voxels 300 does not occur in the observation space 30. The small voxels 300S in the modification may be defined in a three-dimensional shape other than the three-dimensional grid shape, as long as the gap space between the small voxels 300S in the division voxels 300 as the large voxels 300L does not occur. In the modification, the setting of the small voxel 300S by defining the division voxel 300 as the large voxel 300L may be omitted from the process by the search block 110 in S104. In this case, it is preferable to perform a comparison that quantifies the difference in the point group distribution for the large voxel 300L.

The calculation of the average matching degree $\mu_k$ in the modification may be omitted from the process by the matching block 100 in S103, and may be executed in conjunction with the search by the search block 110 in S104. The extraction of the interest voxel 300A in the modification may be omitted from the process by the matching block 100 in S103, and may be executed in conjunction with the search by the search block 110 in S104. Thereby, the attention flag F may not be assigned. In the modification, estimation of the motion state based on the matching result may be omitted from the process by the matching block 100 in S103. In this case, the estimation of the motion state based on the matching result may be performed by a program different from the recognition program and according to a flow different from the recognition flow.

In the modification, the transmission of position information by the search block 110 in S106 may be omitted. In the modification, the monitoring of the difference ΔN by the monitoring block 120 in S107 may be omitted. In this case, or in the modification where the monitoring of the difference ΔN is performed, the transmission of the abnormality notification by the monitoring block 120 in S108 may be omitted. In addition to the above, the host vehicle to which the object recognition system 1 is applied in the modification may be, for example, a drone whose travel can be remotely controlled by the remote center 8.

The invention claimed is:
1. An object recognition system configured to recognize a mobile object that is movable in an observation space observed by an observation device of a host vehicle, the system comprising a processor configured to:
    perform matching of a three-dimensional dynamic map representing a state of a mapping point group obtained by mapping of a target existing in the observation space and three-dimensional observation data representing a state of an observation point group observed in the observation space;
    perform search of a candidate point of the mobile object based on the matching from the three-dimensional observation data, the candidate point including a first observation point that does not exist in the three-dimensional dynamic map and a second observation point different from a mapping point of the three-dimensional dynamic map; and
    perform identification of the mobile object based on the candidate point,
    wherein
    the matching of the three-dimensional dynamic map and the three-dimensional observation data includes matching of the three-dimensional dynamic map and the three-dimensional observation data for each three-dimensional voxel obtained by dividing the observation space, and
    the search of the candidate point includes:

defining the three-dimensional voxel as a large voxel and setting a plurality of small voxels obtained by dividing the large voxel;

searching a candidate voxel in which the candidate point is predicted to be extracted based on a matching result of the three-dimensional dynamic map and the three-dimensional observation data in the large voxel;

distinguishing between the first observation point that does not exist in the three-dimensional dynamic map in the plurality of small voxels and the second observation point different from the mapping point of the three-dimensional dynamic map in the plurality of small voxels by performing comparison that: is comparison of a point group distribution of the three-dimensional dynamic map and the three-dimensional observation data for each three-dimensional voxel; and is comparison of the three-dimensional dynamic map and the three-dimensional observation data in the plurality of small voxels set as the candidate voxel; and extracting the candidate point.

2. The object recognition system according to claim 1, wherein the processor is further configured to monitor a difference between a real number of the candidate point at an extracted specific time and a prediction number of the candidate point at the specific time predicted based on the real number of the candidate point at a past time before the specific time, and the identification of the mobile object includes identifying the mobile object based on the candidate point at the specific time when the difference is within an allowable range.

3. An object recognition system configured to recognize a mobile object that is movable in an observation space observed by an observation device of a host vehicle, the system comprising a processor configured to:

perform matching between a three-dimensional dynamic map representing a state of a mapping point group obtained by mapping of a target existing in the observation space and three-dimensional observation data representing a state of an observation point group observed in the observation space;

search a candidate point of the mobile object based on the matching from the three-dimensional observation data, the candidate point including a first observation point that does not exist in the three-dimensional dynamic map and a second observation point different from a mapping point of the three-dimensional dynamic map;

monitor a difference between a real number of the candidate point at an extracted specific time and a prediction number of the candidate point at the specific time predicted based on the real number of the candidate point at a past time before the specific time; and perform identification of the mobile object based on the candidate point, wherein the identification of the mobile object includes identifying the mobile object based on the candidate point at the specific time when the difference is within an allowable range.

4. The object recognition system according to claim 3, wherein the identification of the mobile object includes transmitting an abnormality notification associated with the three-dimensional dynamic map to a remote center that is communicable with the host vehicle when the difference is outside an allowable range, and the processor is further configured to acquire the updated three-dimensional dynamic map from the remote center after transmitting the abnormality notification.

5. The object recognition system according to claim 1, wherein the search of the candidate point includes: transmitting, as information of a deviation point deviated from the three-dimensional dynamic map in the three-dimensional observation data, position information of the candidate point that has been extracted, to a remote center that is communicable with the host vehicle, and the processor is further configured to acquire the updated three-dimensional dynamic map from the remote center after transmitting the position information.

6. An object recognition method that is executed by a processor for recognizing a mobile object that is movable in an observation space observed by an observation device of a host vehicle, the method comprising:

performing matching between a three-dimensional dynamic map representing a state of a mapping point group obtained by mapping of a target existing in the observation space and three-dimensional observation data representing a state of an observation point group observed in the observation space;

performing search of a candidate point of the mobile object based on the matching from the three-dimensional observation data, the candidate point including a first observation point that does not exist in the three-dimensional dynamic map and a second observation point different from a mapping point of the three-dimensional dynamic map; and performing identification of the mobile object based on the candidate point, wherein the matching of the three-dimensional dynamic map and the three-dimensional observation data includes matching of the three-dimensional dynamic map and the three-dimensional observation data for each three-dimensional voxel obtained by dividing the observation space, and the search of the candidate point includes:

defining the three-dimensional voxel as a large voxel and setting a plurality of small voxels obtained by dividing the large voxel;

searching a candidate voxel in which the candidate point is predicted to be extracted based on a matching result of the three-dimensional dynamic map and the three-dimensional observation data in the large voxel;

distinguishing between the first observation point that does not exist in the three-dimensional dynamic map in the plurality of small voxels and the second observation point different from the mapping point of the three-dimensional dynamic map in the plurality of small voxels by performing comparison that: is comparison of a point group distribution of the three-dimensional dynamic map and the three-dimensional observation data for each three-dimensional voxel; and is comparison of the three-dimensional dynamic map and the three-dimensional observation data in the plurality of small voxels set as the candidate voxel; and extracting the candidate point.

7. An object recognition method that is executed by a processor for recognizing a mobile object that is movable in an observation space observed by an observation device of a host vehicle, the method comprising:

performing matching between a three-dimensional dynamic map representing a state of a mapping point group obtained by mapping of a target existing in the observation space and three-dimensional observation data representing a state of an observation point group observed in the observation space;

searching a candidate point of the mobile object based on the matching from the three-dimensional observation data, the candidate point including a first observation point that does not exist in the three-dimensional dynamic map and a second observation point different from a mapping point of the three-dimensional dynamic map;

monitoring a difference between a real number of the candidate point at an extracted specific time and a prediction number of the candidate point at the specific time predicted based on the real number of the candidate point at a past time before the specific time; and performing identification of the mobile object based on the candidate point, wherein the identification of the mobile object includes identifying the mobile object based on the candidate point at the specific time when the difference is within an allowable range.

8. A non-transitory computer-readable storage medium storing an object recognition program that is executed by a processor for recognizing a mobile object that is movable in an observation space observed by an observation device of a host vehicle, the program including instructions configured to cause the processor to:

perform matching between a three-dimensional dynamic map representing a state of a mapping point group obtained by mapping of a target existing in the observation space and three-dimensional observation data representing a state of an observation point group observed in the observation space;

perform search of a candidate point of the mobile object based on the matching from the three-dimensional observation data, the candidate point including a first observation point that does not exist in the three-dimensional dynamic map and a second observation point different from a mapping point of the three-dimensional dynamic map; and perform identification of the mobile object based on the candidate point, wherein the matching of the three-dimensional dynamic map and the three-dimensional observation data includes matching of the three-dimensional dynamic map and the three-dimensional observation data for each three-dimensional voxel obtained by dividing the observation space, and the search of the candidate point includes:

defining the three-dimensional voxel as a large voxel and setting a plurality of small voxels obtained by dividing the large voxel;

searching a candidate voxel in which the candidate point is predicted to be extracted based on a matching result of the three-dimensional dynamic map and the three-dimensional observation data in the large voxel;

distinguishing between the first observation point that does not exist in the three-dimensional dynamic map in the plurality of small voxels and the second observation point different from the mapping point of the three-dimensional dynamic map in the plurality of small voxels by performing comparison that: is comparison of a point group distribution of the three-dimensional dynamic map and the three-dimensional observation data for each three-dimensional voxel; and is comparison of the three-dimensional dynamic map and the three-dimensional observation data in the plurality of small voxels set as the candidate voxel; and extracting the candidate point.

9. A non-transitory computer-readable storage medium storing an object recognition program that is executed by a processor for recognizing a mobile object that is movable in an observation space observed by an observation device of a host vehicle, the program including instructions configured to cause the processor to:

perform matching between a three-dimensional dynamic map representing a state of a mapping point group obtained by mapping of a target existing in the observation space and three-dimensional observation data representing a state of an observation point group observed in the observation space;

perform search of a candidate point of the mobile object based on the matching from the three-dimensional observation data, the candidate point including a first observation point that does not exist in the three-dimensional dynamic map and a second observation point different from a mapping point of the three-dimensional dynamic map; and monitor a difference between a real number of the candidate point at an extracted specific time and a prediction number of the candidate point at the specific time predicted based on the real number of the candidate point at a past time before the specific time; and perform identification of the mobile object based on the candidate point, wherein the identification of the mobile object includes identifying the mobile object based on the candidate point at the specific time when the difference is within an allowable range.

* * * * *